C. CICCOLINI.
MACHINE FOR MECHANICALLY TILLING THE SOIL.
APPLICATION FILED AUG. 9, 1912.
1,076,745.
Patented Oct. 28, 1913.
2 SHEETS—SHEET 2.
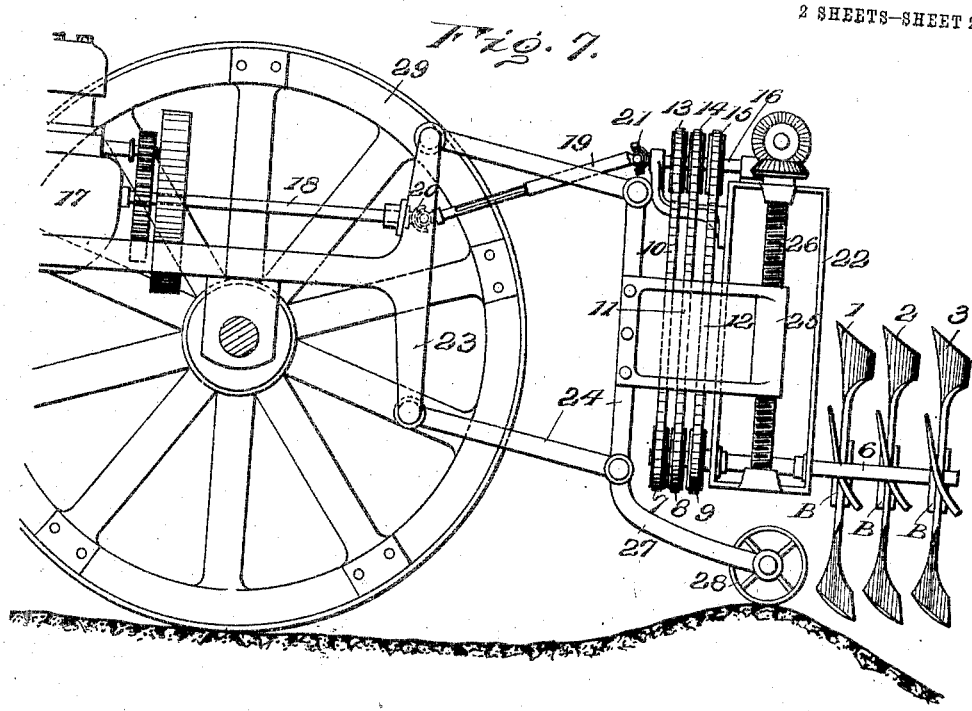
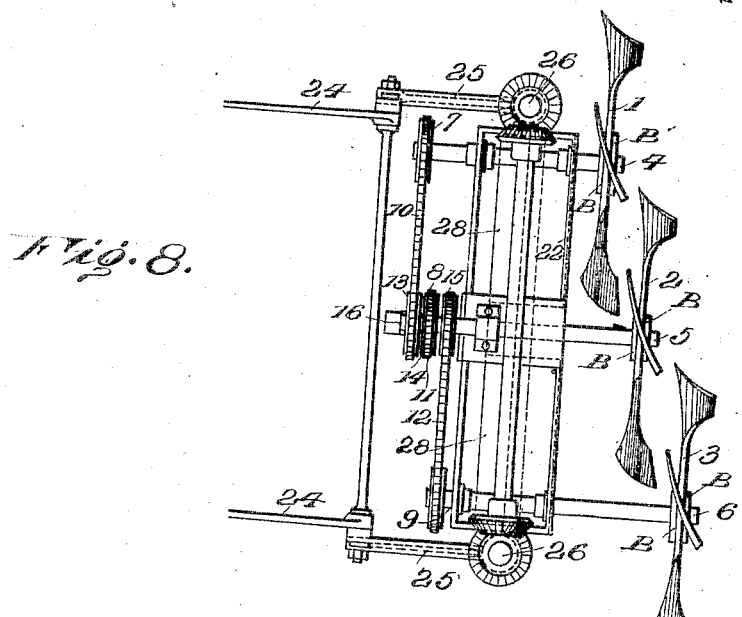

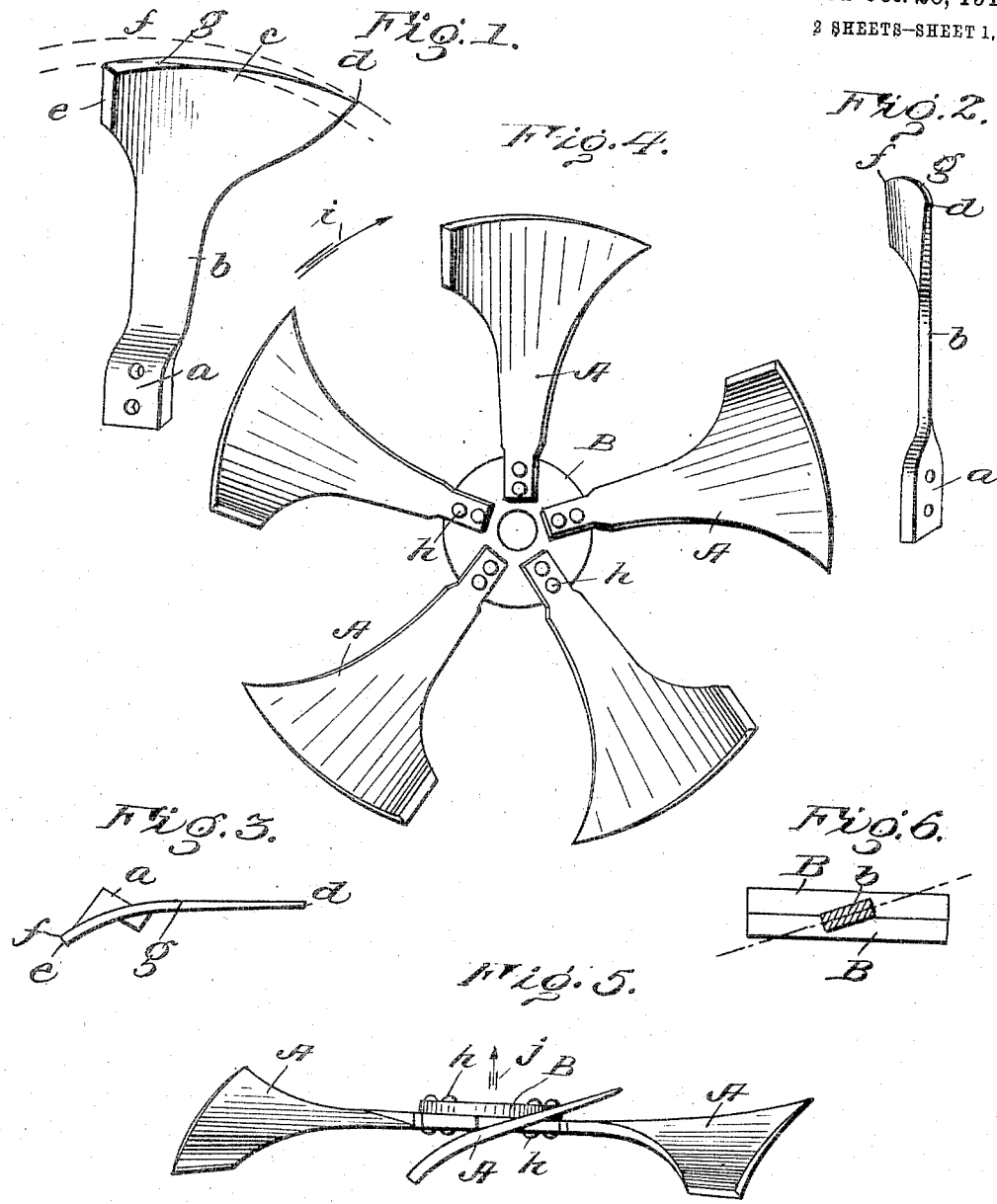

UNITED STATES PATENT OFFICE.

CLÉMENT CICCOLINI, OF PARIS, FRANCE.

MACHINE FOR MECHANICALLY TILLING THE SOIL.

1,076,745.  Specification of Letters Patent.  Patented Oct. 28, 1913.

Application filed August 9, 1912. Serial No. 714,265.

*To all whom it may concern:*

Be it known that I, CLÉMENT CICCOLINI, a subject of the King of Italy, and resident of Paris, France, (whose post-office address is 14 Rue Tronches, Paris, France,) have invented a new and useful Improvement in Machines for Mechanically Tilling the Soil, which invention is fully set forth in the following specification.

This invention relates to a machine for mechanically tilling the soil by means of special tools which from their shape and the results of their work may be compared to actual spades. This machine for mechanically tilling the soil is chiefly constructed of a frame mounted upon wheels carrying a suitable explosion, steam, electric or other motor for driving the tools, the said motor also being capable of effecting the traction of the machine unless the said machine is actuated by an exterior mechanical or animal force. The chief characteristic of this machine, outside the general arrangement of the parts constituting the same, is the form of the tool which tills the soil which tool has been devised so as to give rise to as little friction as possible.

In the accompanying drawings: Figures 1, 2 and 3 show one of the tools in side elevation, front elevation and plan respectively. Figs. 4 and 5 show by way of example a rose or crown formed with the said tools arranged radially. Fig. 6 is a modification showing another method of fixing the tools upon the hub, allowing of using flat tools. Fig. 7 is an elevation illustrating a method of application of these tools to a machine for tilling the soil according to the invention. Fig. 8 is a plan showing the arrangement of the tool carrying frame.

As shown in Figs. 1, 2 and 3 the tilling tool consists of a base $a$, a web $b$ and a spreading head $c$ with a cutting edge on the side where it enters the ground, so that from the base up to the end $d$ of the spreading head the said tool is progressively and continuously twisted. The spreading head is provided with a heel $e$ which can be more or less twisted toward the rear. The object of this arrangement is that when the tool turns toward the right hand it enters the ground with the point, and with its cutting edge, exerting upon the detached clod of earth a pressure from the front toward the rear, whereby the advance of the machine is not only unimpeded but is even facilitated; the tool therefore enters the ground like an actual spade. The heel $e$ serves the purpose of a diverter by completely turning over the detached clod of earth. It will also be seen by reference to Fig. 1 that the front end $d$ describes, in the rotary movement of the tool, a circumference of larger radius than that described by the end $f$ of the heel $e$. In this manner the friction upon the upper edges $g$ of the tool is reduced to a minimum, which is of greatest importance from the point of view of the force to be developed.

The various tools are preferably mounted radially like the spokes of a wheel perpendicularly to a common axis so as to constitute a kind of rose. By reason of the spreading of the tools it will be seen that the mass is carried back toward the periphery and that the whole constitutes a fly wheel. The result is that these roses turning at a great speed, the live force of the tools forming a rose is added to that of the tool entering the ground and serves to overcome the abnormal resistances which might there be met with.

The tools A can be mounted as shown in Figs. 4 and 5 by means of disks clamping the base of the tools, which disks are united by bolts $h$. In Figs. 4 and 5 one of the disks is supposed to be removed. In Figs. 4 and 5 the tools are shown five in number, but any other suitable number can be employed. Fig. 6 illustrates how a curve starting from the base $a$ can be avoided by directly mounting the said tools in an inclined manner with relation to the hub. In this case instead of the required inclination of the tool with relation to the hub arising from the curve of the tool, it simply arises from the position of the tool with relation to the hub and the tool is flat. It will therefore be seen that the working principle of the tools really consists in causing the latter to enter the ground in a direction inclined with relation to the axis of rotation, that is to say, with relation to the direction of advance of the machine. But the tool with progressive curve shown in Figs. 1, 2 and 3 is preferable, generally speaking to the flat tool the web $b$ of which is mounted inclined in the two plates B, B having the necessary recesses for receiving the base of the tools.

I will now describe the complete machine as represented by way of example in Figs. 7 and 8. This machine comprises 3 crowns or roses of tools 1, 2 and 3. These crowns of tools are keyed through the medium of their disks B upon three shafts 4, 5, 6. As shown in Fig. 8 these three crowns are placed in three parallel planes so as to avoid interfering of the tools. The third crown 3 for example can, however, be placed in the same plane as crown 1, and only crown 2 be displaced with relation to the two other crowns. From this point of view various combinations are possible. On the shafts 4, 5 and 6 are keyed toothed wheels 7, 8, 9 which receive their rotary movement through the chains 10, 11, 12 running over three pinions 13, 14, 15 keyed upon the shaft 16 actuated by the motor 17 through the medium of the rotatable shafts 18, 19 having two universal joints 20, 21 the latter of which is connected to one end of the shaft 16. Moreover the tool holding frame 22 is connected to the main frame 23 of the machine by a jointed parallelogram 24 which includes sleeves 25 within which revolve the screws 26 operated in a suitable manner by the driver. The tool carrying frame 22 bears upon the ground through the medium of a small carriage 27 connected to the parallelogram 24 and is provided with rollers 28. This jointed arrangement is designed to cause the tilling tools always to work vertically and at the same depth by rendering them independent of the unevenness of the ground over which travel the wheels 29 which may sometimes rise and sometimes descend. By causing the screws 26 to turn, the displacement of the tool carrying frame 22 is caused so as to regulate the depth of work of the tools and to entirely lift the tools when moving the machine from one place to another without working.

Having now particularly described and ascertained the nature of my said invention, and in what manner the same is to be performed, I declare that what I claim is:

1. A revoluble cultivating implement adapted to be mounted on a hub turning on an axle parallel to the line of advance movement of the cultivator machine, and comprising radially disposed thick and heavy blades having a predetermined pitch and very much spreading toward their peripheries, each presenting a cutting edge terminated by a point like a hack at the periphery and a massive heel at the rear, said heel presenting a much twisted surface merging into the surface proper of said blade to form a mold-board.

2. A revoluble cultivating implement adapted to be mounted on a hub turning on an axle parallel to the advance movement of the cultivator machine, and comprising radially disposed thick and heavy blades having a helicoid surface, a predetermined pitch and spreading very much toward their peripheries, said blades each presenting a cutting edge terminated by a point like a hack at the periphery and a massive heel at the rear, said heel presenting a much twisted surface merging into the surface proper of said blade to form a mold-board.

3. A revoluble cultivating implement adapted to be mounted on a hub turning on an axle parallel to the line of advance movement of the cultivator machine, and comprising plane radially inclined thick and heavy blades having a predetermined pitch and spreading toward their peripheries, said blades each presenting a cutting edge terminated by a point like a hack at the periphery and a massive heel at the rear, said heel presenting a twisted surface merging into the surface proper of said blade to form a mold-board.

In witness whereof, I have hereunto signed my name in the presence of two subscribing witnesses.

CLÉMENT CICCOLINI.

Witnesses:
 DE ANGELI GIOVANI,
 FRANCESCO CODRANIS.

Copies of this patent may be obtained for five cents each, by addressing the "Commissioner of Patents, Washington, D. C."